(12) United States Patent
Hystad (10) Patent No.: US 12,426,581 B2
(45) Date of Patent: Sep. 30, 2025

(54) CONTROL SYSTEM AND METHOD OF CONTROLLING TOWED MARINE OBJECT

(71) Applicant: Karmøy Winch AS, Kopervik (NO)

(72) Inventor: Magne Hystad, Kopervik (NO)

(73) Assignee: Karmøy Winch AS, Kopervik (NO)

( * ) Notice: Subject to any disclaimer, the term of this patent is extended or adjusted under 35 U.S.C. 154(b) by 738 days.

(21) Appl. No.: 17/637,695

(22) PCT Filed: Aug. 21, 2020

(86) PCT No.: PCT/NO2020/050212
§ 371 (c)(1),
(2) Date: Feb. 23, 2022

(87) PCT Pub. No.: WO2021/040530
PCT Pub. Date: Mar. 4, 2021

(65) Prior Publication Data
US 2022/0264855 A1 Aug. 25, 2022

(30) Foreign Application Priority Data
Aug. 23, 2019 (NO) .................................. 20191019

(51) Int. Cl.
*B63B 21/66* (2006.01)
*A01K 73/04* (2006.01)
(Continued)

(52) U.S. Cl.
CPC ............ *A01K 73/04* (2013.01); *B63B 21/663* (2013.01); *B63G 8/22* (2013.01); *B63G 8/42* (2013.01); *G01V 1/3817* (2013.01)

(58) Field of Classification Search
CPC ........ A01K 73/04; B63B 21/663; B63G 8/22; B63G 8/42; G01V 1/3817
See application file for complete search history.

(56) References Cited

U.S. PATENT DOCUMENTS

| 2,730,829 | A | * | 1/1956 | Dennistoun | ............ | A01K 73/04 37/901 |
|---|---|---|---|---|---|---|
| 3,401,477 | A | | 9/1968 | Luketa | | |

(Continued)

FOREIGN PATENT DOCUMENTS

| CN | 1200648 A | 12/1998 |
|---|---|---|
| CN | 1738531 A | 2/2006 |

(Continued)

OTHER PUBLICATIONS

European Search Report issued in the corresponding European Patent Application No. 20857963.1, dated Aug. 23, 2023 in 7 pages.
(Continued)

*Primary Examiner* — Andrew Polay
(74) *Attorney, Agent, or Firm* — Knobbe, Martens, Olson & Bear, LLP (57) ABSTRACT

A control system for a towed object (1, 6; 20; 30; 50) in or on a body of water comprise one or more towing members (3) extending between the object (1) and a towing vessel (2). One or more ballast members (4) are movably connected to a respective one of said one or more towing members (3) and controllably movable at least a distance along its respective towing member. The towed object (1) may be controlled by moving one or more ballast members (4) on a towing member (3) in order to control the catenary (c) of a towing member (3). Individual ballast members (4) may be manipulated individually in order to correct, preserve or otherwise change the geometry of a trawl.

15 Claims, 7 Drawing Sheets

(51) Int. Cl.
  *B63G 8/22* (2006.01)
  *B63G 8/42* (2006.01)
  *G01V 1/38* (2006.01)

(56) References Cited

U.S. PATENT DOCUMENTS

| | | | |
|---|---|---|---|
| 3,404,655 | A | 10/1968 | Fohl |
| 5,058,307 | A | 10/1991 | Garrett |
| 2010/0139147 | A1 | 6/2010 | Rokke et al. |
| 2017/0248722 | A1* | 8/2017 | Olivier .............. G01V 1/3817 |
| 2020/0015464 | A1 | 1/2020 | Hystad |
| 2020/0108898 | A1* | 4/2020 | Martin .............. B63B 1/285 |

FOREIGN PATENT DOCUMENTS

| | | | |
|---|---|---|---|
| CN | 203884486 U | 10/2014 | |
| CN | 104730588 A | 6/2015 | |
| DK | 201870583 A1 | 11/2018 | |
| GB | 633028 A | 12/1949 | |
| GB | 702650 A | 1/1954 | |
| GB | 811853 A | 4/1959 | |
| JP | S 51-74880 A | 6/1976 | |
| JP | S 60-38570 U | 3/1985 | |
| JP | 2019-15543 A | 1/2019 | |
| NO | 307541 B1 | 4/2000 | |
| NO | 20171262 A1 | 1/2019 | |
| NO | 20181676 A1 | 3/2019 | |
| SU | 475582 A1 | 6/1975 | |
| SU | 1300799 A1 | 4/1991 | |
| WO | 2005/004593 A1 | 1/2005 | |
| WO | 2007/108702 A1 | 9/2007 | |
| WO | 2008/048107 A1 | 4/2008 | |
| WO | 2010/015254 A1 | 2/2010 | |
| WO | 2014/122494 A1 | 8/2014 | |
| WO | 2017/147577 A1 | 8/2017 | |
| WO | 2017/222390 A1 | 12/2017 | |
| WO | 2018/174723 A1 | 9/2018 | |

OTHER PUBLICATIONS

Chinese Office Action issued in the corresponding Chinese Patent Application No. 202080074062.0, dated Oct. 9, 2023 in 24 pages including English translation.
Russian Search Report issued in the corresponding Russian Patent Application No. 2022107128, dated Sep. 13, 2023 in 4 pages including English translation.
International Preliminary Report on Patentability issued for International Patent Application No. PCT/NO2020/050212, dated Feb. 17, 2022 in 7 pages.
Danish Office Action and Search Report issued in the corresponding Danish Patent Application No. PA 2022 70109, dated Feb. 13, 2023 in 7 pages.
Office Action issued in the corresponding Chilean Patent Application No. 2022-000419, dated Jul. 10, 2023 in 30 pages including English translation.
Office Action issued in the corresponding Chinese Patent Application No. 202080074062.0, dated Feb. 7, 2023 in 14 pages including English translation.
International Search Report for International Patent Application No. PCT/NO2020/050212, dated Nov. 3, 2020 in 2 pages.
Norwegian Search Report for Norwegian Patent Application No. 20191019, dated Feb. 26, 2020 in 2 pages.

\* cited by examiner

CONTROL SYSTEM AND METHOD OF CONTROLLING TOWED MARINE OBJECT

CROSS-REFERENCE TO RELATED APPLICATIONS

This application is the U.S. National Phase under 35. U.S.C. § 371 of International Application PCT/NO2020/050212, filed Aug. 21, 2020, which claims priority to Norwegian patent application No. 20191019, filed Aug. 23, 2019. The disclosures of the above-described applications are hereby incorporated by reference in their entirety.

FIELD OF THE INVENTION

The invention concerns a system and a method by means of which one or more towed marine objects may be controlled, as set out by the preambles of claims 1 and 11. The marine objects may be submerged objects (e.g. trawls or seismic streamer cables), or objects that float in the water surface (e.g. barges, floating platforms, or ships).

BACKGROUND OF THE INVENTION

Trawls are commonly used for catching various types of marine life, and also for collecting other objects on or near the seabed. In general, and referring to FIG. 2, one trawl type comprises a funnel-shaped bag 1 of a flexible material having a net or mesh structure which allows water to pass through. The trawl mouth (front end) is open and the narrower tail end is closed off. The mesh size is dimensioned according to the intended catch. The trawl is normally towed through the water by one or more vessels 2 (trawler) and maintained at a desired depth by suitable ballast elements. In one configuration—bottom trawling—the trawl is towed along or close to the seabed. In another configuration—midwater trawling (also known as pelagic trawling)—the trawl is towed through free water above the seabed. Midwater trawling catches various types of zooplankton (such as krill), pelagic fish such as anchovies, shrimp, tuna and mackerel, whereas bottom trawling targets both bottom-living fish and semi-pelagic fish such as cod, halibut and rockfish, as well as other objects on the seabed.

The vertical spread of the trawl bag (net) is normally provided by one or more buoyancy elements 10 in the upper region of the trawl mouth (front end), and one or more ballast elements (weights) 7 at or near the trawl mouth bottom. The trawl bag's horizontal spread is normally provided by two trawl doors 6, one on each side of the trawl mouth. Trawl doors come in various sizes and shapes and are designed to keep in contact with the sea bottom (when bottom trawling) or to remain elevated at a desired water depth. The trawl doors essentially act as wings, having a shape and/or inclination (angle of attack) to provide a hydrodynamic force and thus maintain a horizontal spread. The towing vessel must maintain a certain speed for the trawl doors—and hence the trawl itself—to remain functional. Therefore, there is normally a minimum speed at which a trawl can be towed and still maintain its integrity and fulfil its intended purpose. This minimum trawl speed also affects the towing vessel's turn radius: Too sharp a turn may cause the trawl to "stall" and collapse.

During trawling, the catch may be retrieved by hoisting the trawl to the surface or onto a ship, or by pumping the catch to the surface through a hose which is connected to the back end of the trawl bag. One example is described in WO 2018/174723, incorporated here as a reference. The latter method is used to retrieve for example zooplankton.

Another example is found in NO 20181676, which describes a trawl arrangement comprising a trawler, a trawl bag assembly coupled to the trawler by a number of separately controllable trawl connections such as suitable wires, chains or ropes, and at least two outer trawl doors which are connected at least indirectly to (or near) the lateral extremities of the trawl bag assembly. Trawls are well known in the art, and need therefore not be described in more detail here.

The prior art also includes WO 2014/122494 A1, which describes a surveying apparatus having at least one survey cable, each survey cable having a proximal end attached to a mother vessel, a distal end connected to at least one subsurface towing vessel, and at least one survey device connected to the survey cable between the proximal end and the distal end. The survey cable extends in a direction perpendicular to a longitudinal axis of the mother vessel during a survey. The survey cables extend a distance sideways from the mother vessel, for example under an ice cap, e.g. solid ice or ice floes.

Figure 1:
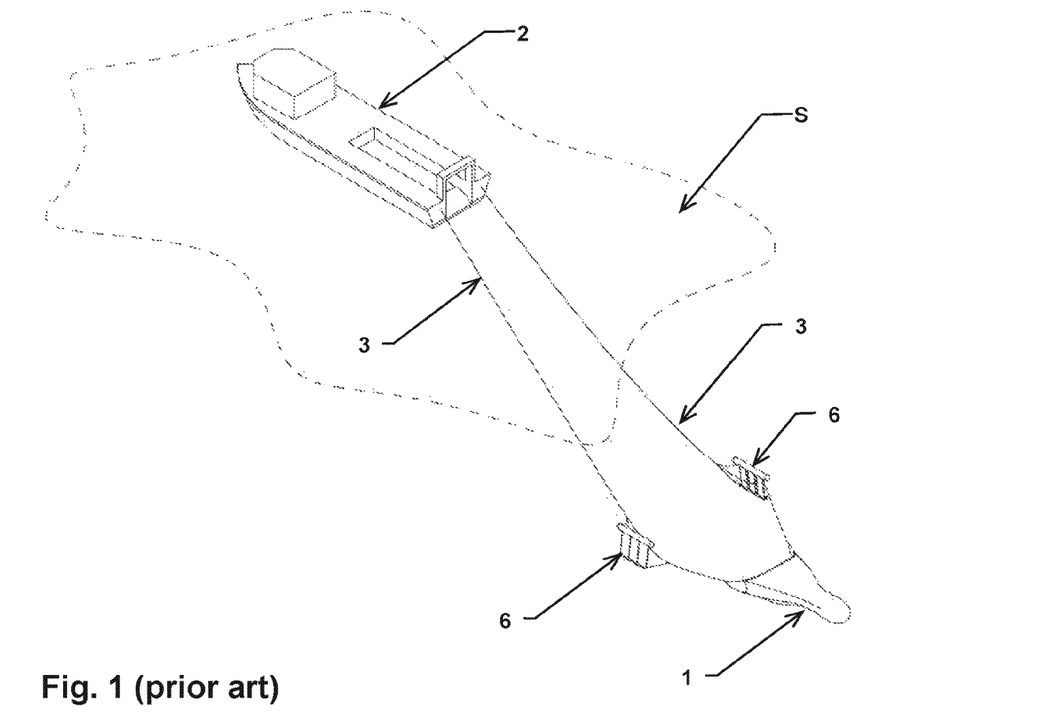
FIG. 1 is a sketch in a perspective view, illustrating in principle towed object (a trawl) being towed at a distance behind a towing vessel (trawler) in a body of water, according to the prior art.
Figure 2:
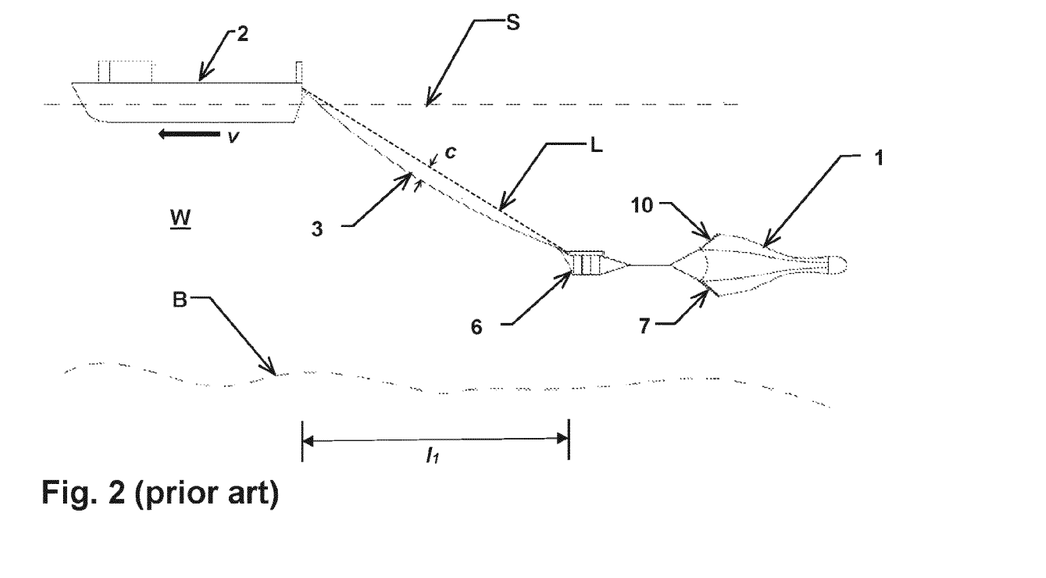
FIG. 2 is a sketch in a side view, illustrating in principle a trawl being towed behind at a distance behind a trawler in a body of water, according to the prior art, and illustrates also how a trawl wire forms a catenary in the water.

FIGS. 1 and 2 illustrate a trawl 1 having two trawl doors 6 and being towed by a trawler 2 in a body of water W, a distance $l_1$ behind the trawler and below the water surface S. The trawl doors 6 are substantially similar but arranged to deflect the trawl mouth in opposite directions. For the purpose of this description, the trawl and trawl doors may be considered as one unit, referred to collectively as the trawl. The trawler moves at a speed v relative to the water and is connected to the trawl (via trawl doors) by two trawl wires 3. The skilled person will understand that more or fewer trawl wires may be used. For example, a third, intermediate, trawl wire may be added in to provide support for a hose extending from the trawl bag back end to the vessel.

The trawler 2, trawl 1 and trawl wires 3$a,b$, together form a dynamic system in which the trawl wire(s) in effect act as a spring by virtue of its ability to form a catenary. The trawl wires takes up the slack that would otherwise form due to the relative movement between the trawler and the trawl. In FIG. 2, the catenary is denoted c and is the deflection of the trawl wires with respect to the imaginary straight line L between the trawler and the trawl (here: the trawl doors).

During trawling, and particularly in midwater (pelagic) trawling, in may be necessary or desirable to elevate the trawl in the body of water, from a greater to a lesser depth. In the prior art methods, this is done by reeling in the trawl wire(s), which reduces the length of deployed trawl wire(s) and the distance between the trawler and the trawl. This state allows a much lesser catenary to be formed, and in extreme cases none at all, whereby virtually all elasticity (and hence damping) in the system is greatly reduced. This may lead to severe dynamic loads on the trawler, the trawl and the wire(s), and cause the trawling operation to be terminated. The reeling-in operation also involves a risk of the trawl wire(s) being tangled in the trawler's propeller or rudder. Furthermore, with the shortened distance, the trawler-and-trawl spread is less controllable, especially during turns. Finally, especially in the case of trawling for krill or other types of zooplankton, reducing the distance between trawler and trawl makes it necessary to re-arrange the above-mentioned hose between the back end of the trawl bag and the trawler.

A problem associated with bottom trawling, is that the trawl doors and sometimes parts of the trawl are dragged along the seabed, causing considerable damage to marine flora and fauna on the seabed.

The prior art includes GB 811 853 A (published in 1959), which discloses a variable buoyancy float structure adapted to be towed at variable depths and for towing a trawl net. The float structure comprises at least one tank charged with pressurized air, at least one chamber having ports through which seawater may enter or discharge, means for controlled admission and escape of compressed air for variation of the amount of seawater in the chamber and accordingly for adjustment of the buoyancy of the float, and a compressed air container carried by the float and supplying the air admission and escape means. The air container comprises an air delivery valve and an air discharge valve resiliently loaded towards closed position, the two valves being connected for alternate opening and closing by motivating means consisting of a member displaceable by a diaphragm subjected on one side to the pressure within the chamber and on the other side to air at a pressure adapted to be varied in accordance with the desired depth of submergence. The amount of seawater in the chamber is adjusted so that the float is in equilibrium and the float is caused to rise or sink to a new desired depth by blowing seawater out or allowing it to enter through the ports. The equilibrium is again restored at the new depth by blowing out the seawater which was allowed to enter or vice versa.

Another trawl type is the beam trawl, in which the trawl bag's horizontal spread is provided by a beam, generally arranged horizontally in the water. Although the beam trawl does not utilize trawl doors, several of the problems described above apply also to this trawl type.

It is therefore a need for a system whereby the vertical position of an object towed in a body of water may be controlled, without the disadvantages associated with the prior art.

SUMMARY OF THE INVENTION

The invention is set forth and characterized in the main claim, while the dependent claims describe other characteristics of the invention.

It is thus provided a control system for a towed object in or on a body of water, wherein one or more towing members extend between the object and a towing vessel, characterized by one or more ballast members movably connected to a respective one of said one or more towing members and controllably movable at least a distance along its respective towing member.

At least one ballast member and/or the towed object may comprise sensing and detecting means for determining a distance to a seabed. In one embodiment, the control system comprises a control device by means of which the ballast member position on the towing member may be controlled. A weight member may be connected to and extending a distance from the ballast member towards the seabed.

The towed object may be a trawl with trawl boards, an elongate object, such as a cable or riser, or similar, and may comprise buoyancy elements whereby the towed object may have a neutral buoyancy. The towed object may be a vessel towed on the surface of the water.

The towed object and/or at least one of the ballast members do in one embodiment comprise sensing and detecting means configured for determining a distance between said means and the seabed, and the sensing and detecting means is configured to communicate with a transmitter/receiver at a distal location, said transmitter/receiver being configured to communicate with a control unit; said control unit being configured to communicate with a device for controlling the position of at least one ballast member. The control unit may comprise a programmable control unit.

It is also provided a method of controlling a towed object in or on a body of water, characterized by controllably moving one or more ballast members, which is movably connected to a respective one of a towing members extending between the towed object and a towing vessel, at least a distance along its respective towing member, in order to control the catenary of said towing member. Individual ballast members may be manipulated individually in order to correct, preserve or otherwise change the geometry of the towed object and the towed object is a trawl. In one embodiment, movement of one or more ballast members is controlled based on information provided by sensing and detecting means configured for determining a distance between said means and the seabed. The distance may be pre-determined, and entered into a control unit.

BRIEF DESCRIPTION OF THE DRAWINGS

These and other characteristics of the invention will become clear from the following description of an embodiment, given as a non-restrictive example, with reference to the attached schematic drawings, wherein.

DETAILED DESCRIPTION OF AN EMBODIMENT

The following description may use terms such as "horizontal", "vertical", "lateral", "back and forth", "up and down", "upper", "lower", "inner", "outer", "forward", "rear", etc. These terms generally refer to the views and orientations as shown in the drawings and that are associated with a normal use of the invention. The terms are used for the reader's convenience only and shall not be limiting.

A first embodiment of the invention will now be described with reference to FIGS. 3 to 5. A trawl 1 having two trawl doors 6 is being towed by a trawler 2 in a body of water W, a distance behind the trawler and below the water surface S. In the illustrated embodiment, the two trawl doors 6 are substantially similar but arranged to deflect the trawl mouth in opposite directions. Notations a, b, c, etc. behind a reference number will in the following be used to distinguish one item from another, as necessary.

The trawl itself is described in general above with reference to FIG. 2, and is furthermore well known in the art. For the purpose of this description, the trawl and trawl doors may be considered as one unit, referred to collectively as the trawl or the towed object. The trawler moves at a speed v relative to the water and is connected to the trawl (here, via trawl doors) by towing devices 3, here in the form of two trawl wires 3, one to each trawl door. The skilled person will understand that more or fewer towing devices may be used. For example, a third, intermediate, trawl wire may be added in to provide support for a hose extending from the trawl bag back end to the vessel. The invention shall not be limited by the number of towing devices, trawl doors, trawl type, or number of trawls.

As described above, the trawler 2, trawl 1, trawl doors 6 and trawl wires 3, together form a dynamic system in which the trawl wires in effect act as springs by virtue of their ability to form a catenary, and the friction between the wires and the water. The trawl wires (one wire, e.g. in the case of a beam trawl, or more wires) take up the slack that would otherwise form due to the relative movement between the trawler and the towed object (here, the trawl). However, in order to control and augment this catenary, the invented control system comprises a ballast member 4 movably arranged on each towing member (here: trawl wire) 3. The double-headed arrow M in FIG. 5 indicates such movement. The ballast member 4 may be a clump weight or any other solid object having a negative buoyancy suitable for the intended purpose. The ballast member may have a hydrodynamically favourable shape in order to minimize hydrodynamic drag. The ballast member may also comprise means for controlling its weight. The ballast member may be connected to the towing member by means of a housing having wheels, rollers (not shown) or similar. Reference number 5 denotes a control cable by means of which the position of the ballast member 4 on the trawl wire 3 may be adjusted. The cable 5 may be connected to winching means (not shown in FIGS. 3-5) on the vessel (trawler) 2. Pulling on the control cable 5 will elevate the ballast member 4 in the water and thus decrease the catenary, and paying out the control cable will cause the ballast member 4 to sink (by virtue of its negative buoyancy) deeper in the water and thus increase the catenary.

Figure 3:
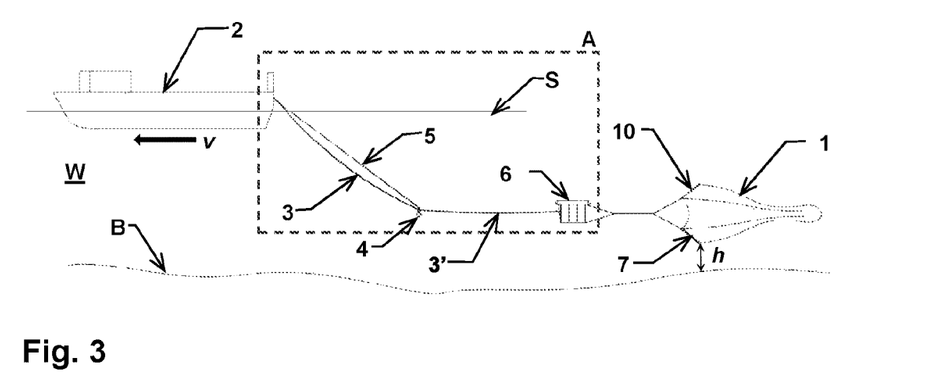
FIG. 3 is a sketch in a side view, illustrating in principle a trawl being towed behind at a distance behind a trawler in a body of water, and illustrates how the trawl wire catenary may be controlled by means of a ballast member.
Figure 4:
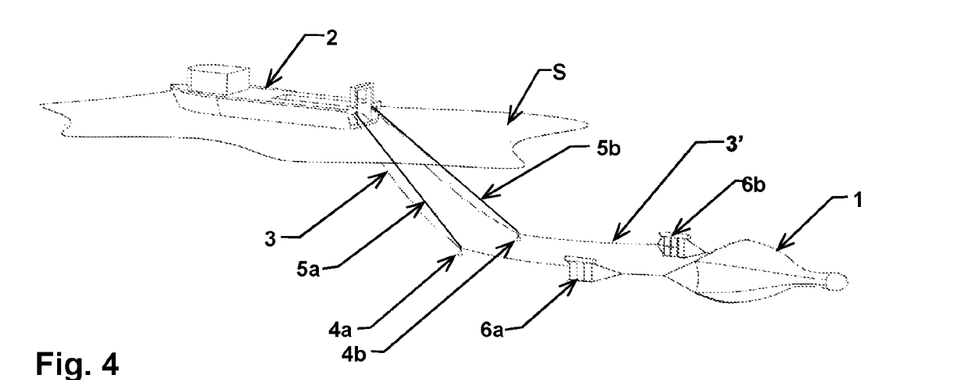
FIG. 4 is a sketch in a perspective view, corresponding to FIG. 4.
Figure 5:
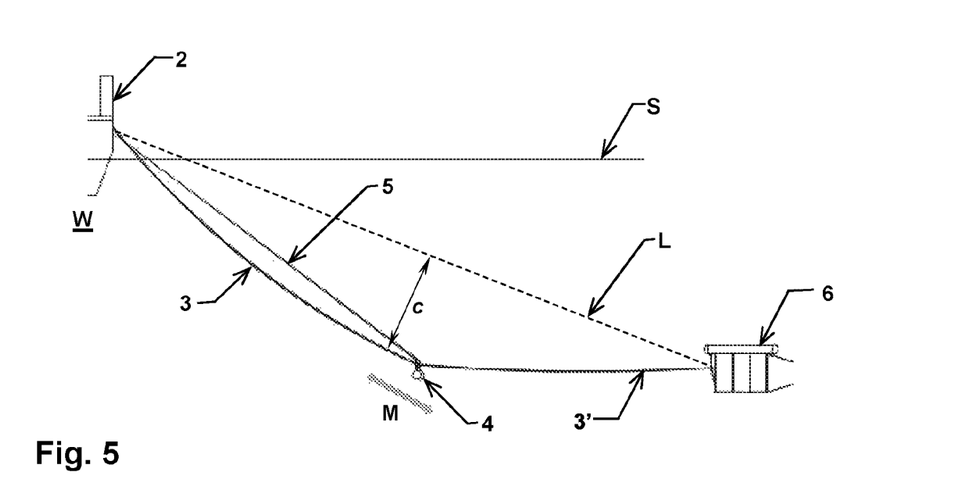
FIG. 5 is an enlarged view of the area "A" in FIG. 3.

Therefore, lowering the ballast member 4 as shown in FIG. 5, increases the catenary c considerably compared the catenary in the prior art configuration (FIG. 2), and the portion of the towing member 3 that extends between the ballast member 4 and the trawl, denoted 3' in FIGS. 3 to 5, is substantially horizontal. There is therefore practically no upward pull on the trawl (trawl doors and trawl), and the trawl depth may be controlled by the manipulation of the ballast members 4.

The invented control system allows the trawling speed to be significantly reduced without compromising the integrity of the trawl. A reduced trawling speed is also preferable when trawling for krill and other zooplankton.

It should be understood that the invented control system also is applicable for a beam trawl, in which the buoyancy elements 10 in the upper region of the trawl mouth (front end) and the trawl doors 6 are replaced by a buoyant beam (not shown), for example (but not limited to) with a 1 metre diameter and 30 metres length (i.e. generally horizontal and transverse to the trawl bag mouth).

Figure 6:
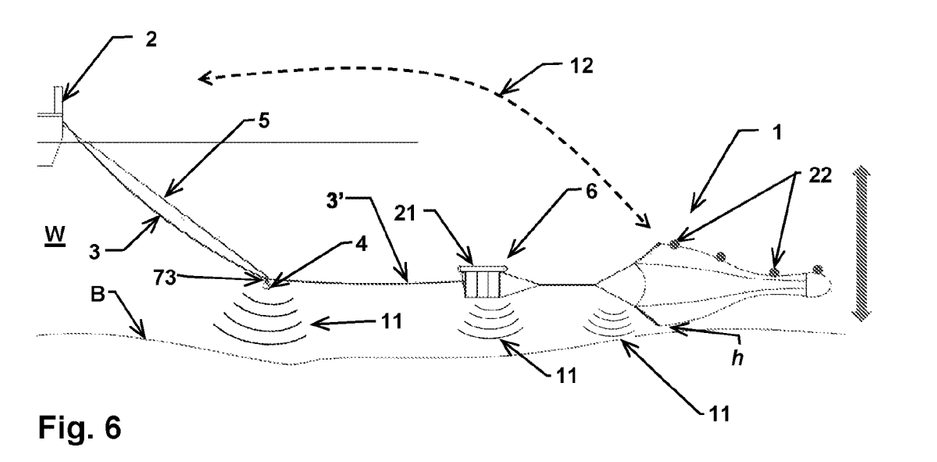
FIGS. 6 and 7 are schematic side views of embodiments of the invention.

A second embodiment of the invention will now be described with reference to FIGS. 6 and 16. Unless otherwise noted, the features and aspects described above with reference to FIGS. 3 to 5, shall apply also to this second embodiment, and the embodiments may be combined. Here, the trawl 1 is provided with buoyancy elements 22, and the trawl door 6 comprises a buoyancy chamber 21. The buoyancy elements 22 and buoyancy chamber 21 may be adjustable and be controlled such that the trawl and trawl doors have a neutral buoyancy. The buoyancy may also be adjusted to be slightly positive, whereby the trawl may be raised to the water surface when the ballast member(s) 4 is (are) lifted towards the surface. This may be done without reeling in the trawl wire.

The ballast member 4 or the housing connecting it to the trawl wire 3, is furnished with a distance-measuring device 73 emitting and receiving signals 11 for determining the distance to the seabed B. Distance-measuring devices (e.g. or echo sounder or sonar) are well known in the art and need therefore not be described further. The signals 11 may be communicated to a control system (not shown in FIGS. 6 and 16) on board the vessel 2 and the position (i.e. depth) of the ballast member 4 may be controlled based on the sensed distance to the seabed. As the trawl and trawl doors are neutrally buoyant and thus balanced in the body of water, the distance h to the seabed may be controlled by a manipulation of the ballast members 4. The contact forces between the towed object and the seabed can thus be minimized or removed.

Figure 16:
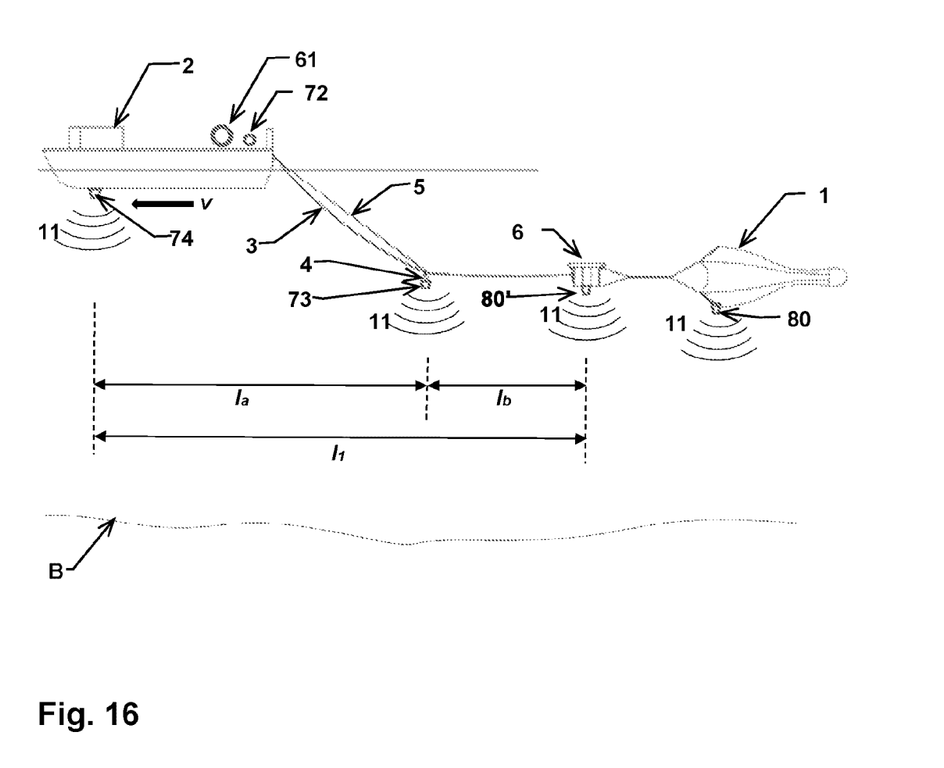
FIG. 16 is a schematic side view of an embodiment of the invention, illustrating in particular distance-measuring equipment and configuration.
Figure 17:
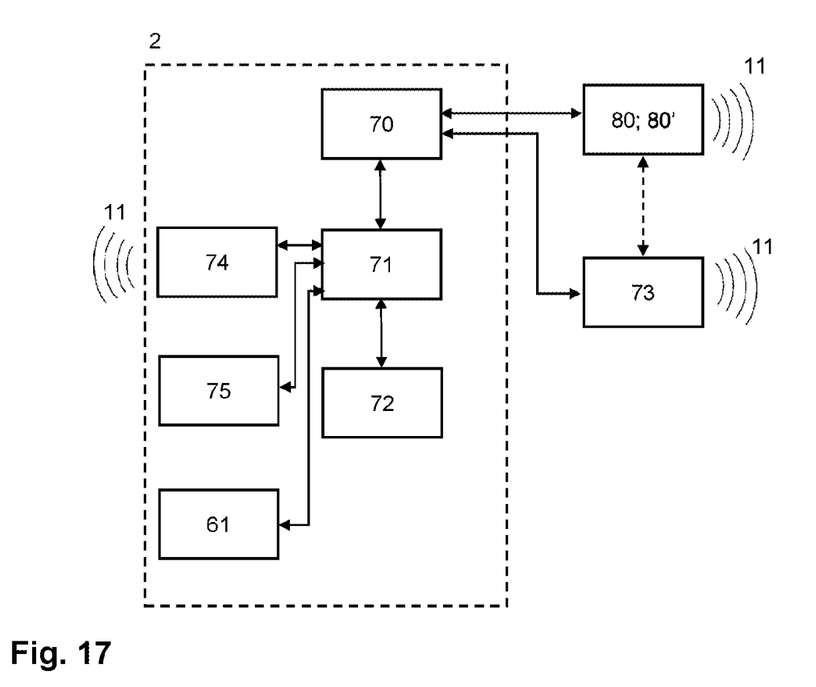
FIG. 17 is a block diagram illustrating a how a towed object may be controlled.

Referring now to FIG. 16 and FIG. 17 a distance-measuring device 80; 80' may be attached to the trawl 1 and/or trawl door 6, either in addition to or as an alternative to the above-mentioned distance-measuring device 73 on the ballast member 4, and be configured to emit and receive signals 11 for determining the distance between the towed object (trawl and/or trawl door) and the seabed B. The signals containing the distance information (indicated by the arrow 12 in FIG. 6) may be communicated to a control system 71 on board the vessel 2. The control system is configured to control the operation of the ballast members control cable(s) 5, whereby the distance between the towed object and the seabed may be controlled and adjusted. This is illustrated schematically in by the block diagram in FIG. 17, where reference number 73 denotes a distance-measuring device on the ballast member 4, and reference numbers 80, 80' denote a distance-measuring device on the trawl door and trawl. It should be understood that the trawl and trawl board may be regarded as one object, end may be replaced by any other towed object (e.g. a beam trawl) as explained above.

The distance determined between the towed object and the seabed is communicated via signal 11 to a transmitter/receiver (e.g. a transceiver or any other transmitter/receiver device known in the art) 70 on the vessel 2. The transceiver 70 communicates the distance information to a control unit 71, which uses this information to send control signals to the trawl wire winch 61 and/or to the winch or other device 72 controlling the position of the ballast member(s) 4. Thus, the trawl wire 3 and/or the control cable 5 may be operated based on input from the distance-measuring device 80; 80'. The control unit 71 may also be connected to the vessel's engine and/or rudder control 75, whereby the vessel speed and/or direction may be controlled based on sensed data from the towed object.

The control unit 71 may comprise a programmable control unit (PLC), whereby an operator may enter a desirable distance (between towed object and seabed) into the PLC, and the PLC thus will control the device 72 controlling the ballast member(s) and/or towed object such that this predetermined, desirable distance is maintained automatically based on the information provided by the signals 11.

The towed object may also be controlled based on sensed depth measurement provided by the vessel's on-board distance-measuring equipment (echo-sounder, sonar, etc) 74.

Referring again to FIG. 16, the distance $l_1$ between the vessel and the towed object may be considerable, for example approximately 1000 meters. The distance $l_b$ between the ballast member 4 and the towed object may also be substantial, for example approximately 300-500 meters. Therefore, in one mode of operation, the distance to seabed sensed by the vessel's on-board distance-measuring equipment 74 may be used for controlling the depth of the towed object, by manipulating the ballast member(s), and/or towed object wire, and/or vessel engine. The control unit 71 may also comprise a proportional-integral-derivative controller (PID controller) or similar device, whereby input data from either one of the distance-measuring equipment units 80, 80', 73, 74 may be used to control the towed object as desired. It should be noted that other sensors (not shown), e.g. temperature, current, velocity) may be fed into the control unit and used as parameters for controlling the towed object.

The communication between the devices identified in FIG. 17 may be as per any means known in the art, hard-wired or wireless.

The set-up illustrated in FIGS. 16 and 17 may thus be used as a control system for a balanced trawl or other object. The device 74 comprise instruments integrated as a part of the ship (vessel), typically echo-sounder, sonars or other kind of instrument that can see the bottom and position of the vessel, fish or krill, or objects in the sea. The device 73 comprise an instrument integrated into the ballast member which is used to manipulate the towed object (e.g. trawl). This will give feedback on the response for operating the ballast member or the main trawl winches. The device 80 and/or 80' comprises an instrument that gives feed-back on how the towed object reacts based on the position of the ballast member or operation of the trawl winch.

The control unit 71 comprises a computer program that receive input from and work with data from the sensors 80, 80', 73, 74. This program will make it possible to operate the trawl in a very controlled way. This will make it possible to be very near by the sea bottom and to keep a constant distance during any towing condition. This will reduce any physical contact with the sea bottom and thus any damage to the sea bottom. Damage to the trawl net may also be avoided.

This system may be set in a "hunting" mode, in which a specific depth region in which the trawl shall operate, is defined, for example between 400 and 800 meters depth. Inside this window, the winch computer control system should also be able to take decision true sonar or echo-sounder to position the trawl in such a way as to optimise the catching potential (fish, krill, etc.) The system may also be manually operated.

The control system can follow any given parameter related to sea depth or distance to sea bottom and is able to actively make its own decision and position the trawl. The control system has feed-back from any and all of the sensors and devices and will actively operate both trawl winches and winch for the ballast member for balancing the trawl.

Figure 7:
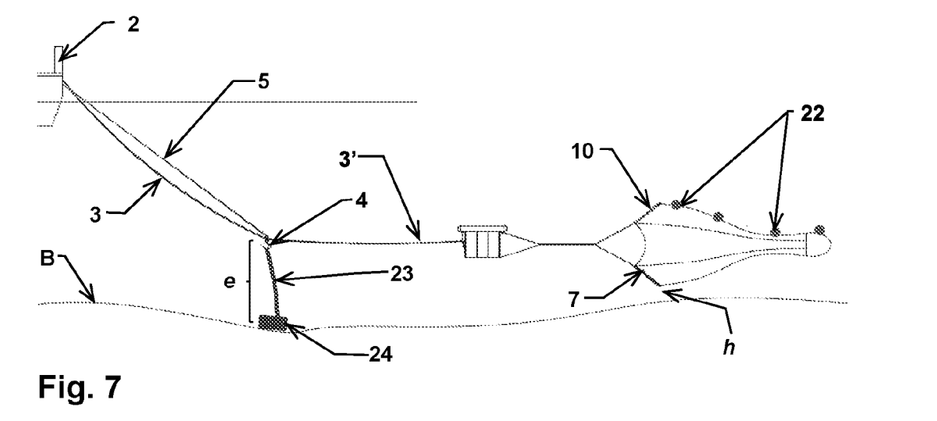
Figure 15:
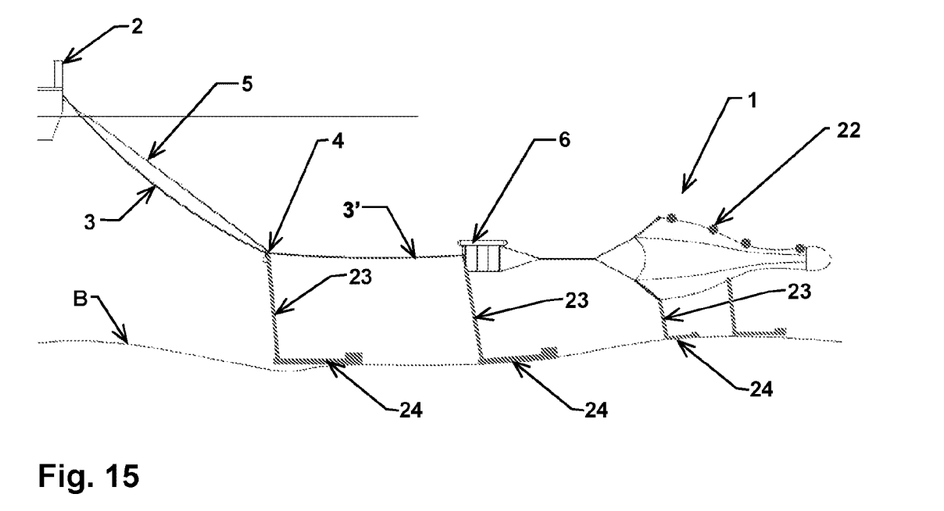
FIG. 15 is a schematic side view of an embodiment of the invention.

A third embodiment of the invention will now be described with reference to FIGS. 7 and 15. Unless otherwise noted, the features and aspects described above with reference to FIGS. 3 to 6, shall apply also to this third embodiment, and the embodiments may be combined. Here, the ballast member 4 or the housing connecting it to the trawl wire 3, is furnished with a clump weight object 24 (or other solid mass) attached to a connection member 23 (e.g. a chain, lanyard, rope, or object with similar function). The clump weight object 24 may be furnished with wheels or rollers to minimize friction against the seabed. The connection member 23 length e may be dimensioned such that the towed object, which is balanced in the water, stays a minimum distance h above the seabed B. The object 24 may be shaped as a skid, and be arranged with respective connection members also underneath the trawl door and trawl, as shown in FIG. 15. The trawl may also comprise sections (not shown) and objects 24 and connection members 23 may be arranged underneath each such section.

Figure 8:
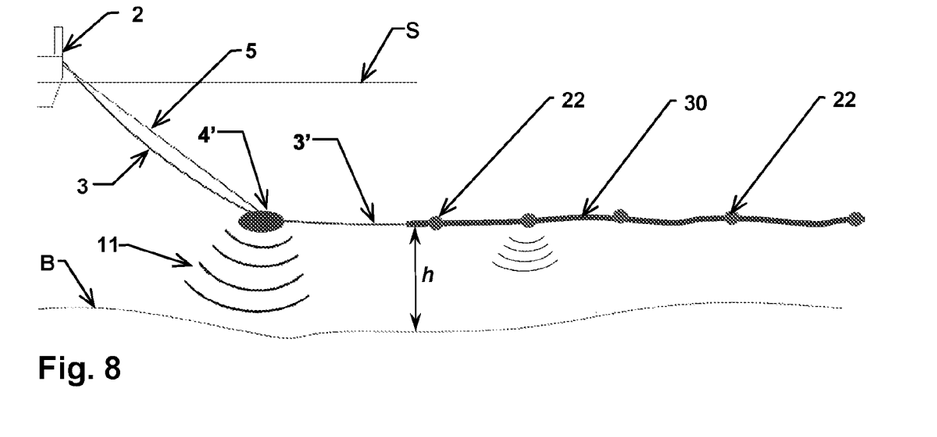
FIGS. 8 and 9 are schematic side views of embodiments of the invention in which the towed object is a seismic streamer cable.
Figure 9:
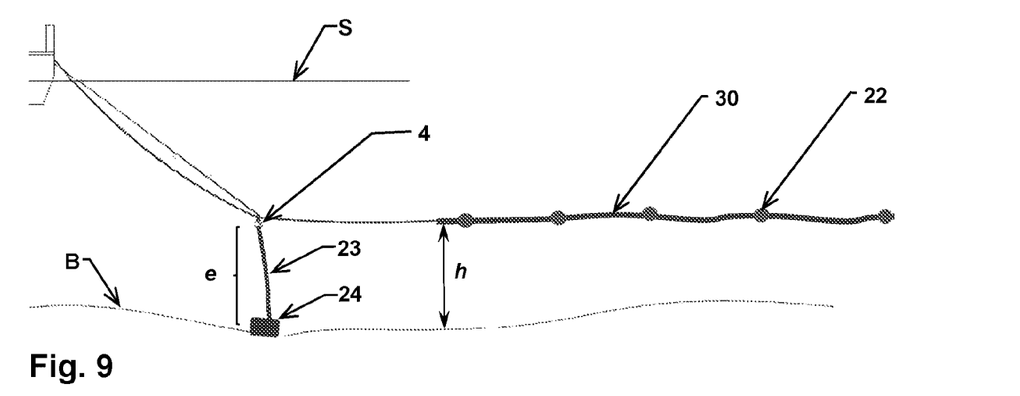

A fourth embodiment of the invention will now be described with reference to FIGS. 8 and 9. Unless otherwise noted, the features and aspects described above with reference to FIGS. 3 to 7, shall apply also to this fourth embodiment, and the embodiments may be combined. Here, the trawl and trawl doors described above have been replaced by a seismic streamer cable 30 having buoyancy elements 22. Although FIG. 8 shows only one streamer, it should be understood that several streamers 30 may be towed by corresponding number of towing devices (wires) 3, the catenary of which is controlled by the manipulation of individual ballast members 4 as described above. Deflectors (not shown), similar to the trawl doors described above, may also be used to form a spread of seismic streamer cables, which is well known in the art. FIG. 8 also shows a variant of the ballast member 4', which is shaped to exhibit favourable hydrodynamic characteristics. This variant may also be used in other embodiments of the invention. The invented control system thus facilitates towing of a streamer spread at a desired (and constant) depth, well below the water surface S. Exposure to wind, waves and other surface conditions is thereby mitigated or even avoided. The invention shall not be restricted to seismic streamer cables, but is also applicable to other towed objects. Examples of such towed objects are cables, pipelines, hoses, umbilicals, rises used in the petroleum industry, etc.

Figure 10:
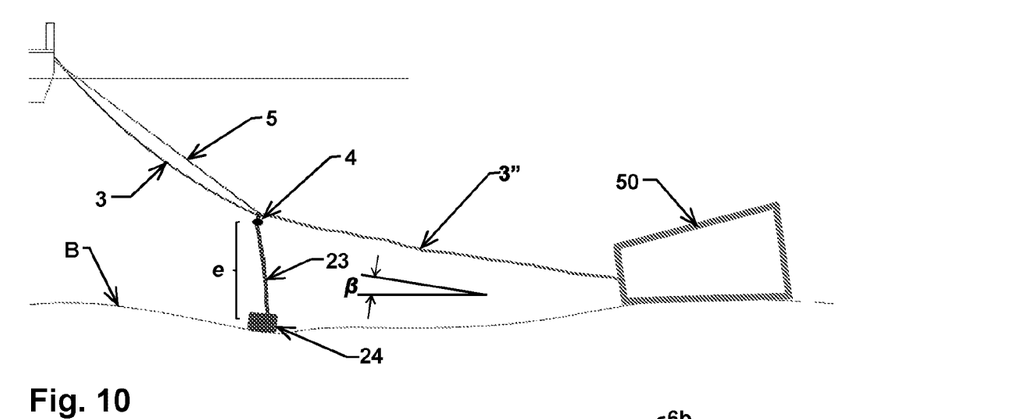
FIG. 10 is a schematic side view of an embodiment of the invention in which the towed object is an object dragged or moved along the seabed.

A fifth embodiment of the invention will now be described with reference to FIG. 10. Unless otherwise noted, the features and aspects described above with reference to FIGS. 3 to 9, shall apply also to this fourth embodiment, and the embodiments may be combined. Here, the towed object is an object 50 which is dragged along the seabed. This dragged object 50 may be a plough, scraper or collector container, used for e.g. collecting objects from the seabed. One possible use for such dragged object is mining for minerals. By adjusting the length e and/or manipulating the ballast member 4 on the 3o towing device (wire, rope, or similar) 3, the inclination angle α of the portion 3" of the towing device that extends between the ballast member 4 and the towed (dragged) object may be changed, thereby increasing or decreasing the downward force exerted by the towed object 50 onto the seabed. Although FIG. 10 shows only one towed object 50, it should be understood that several objects 50 may be towed by a several towing devices (wires) 3, as described above.

Figure 11:
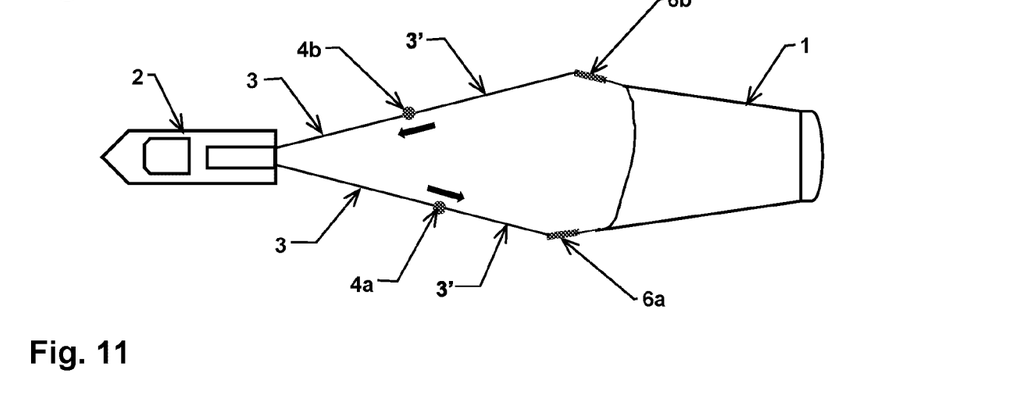
FIG. 11 is a schematic top view of a misaligned trawl.
Figure 12:
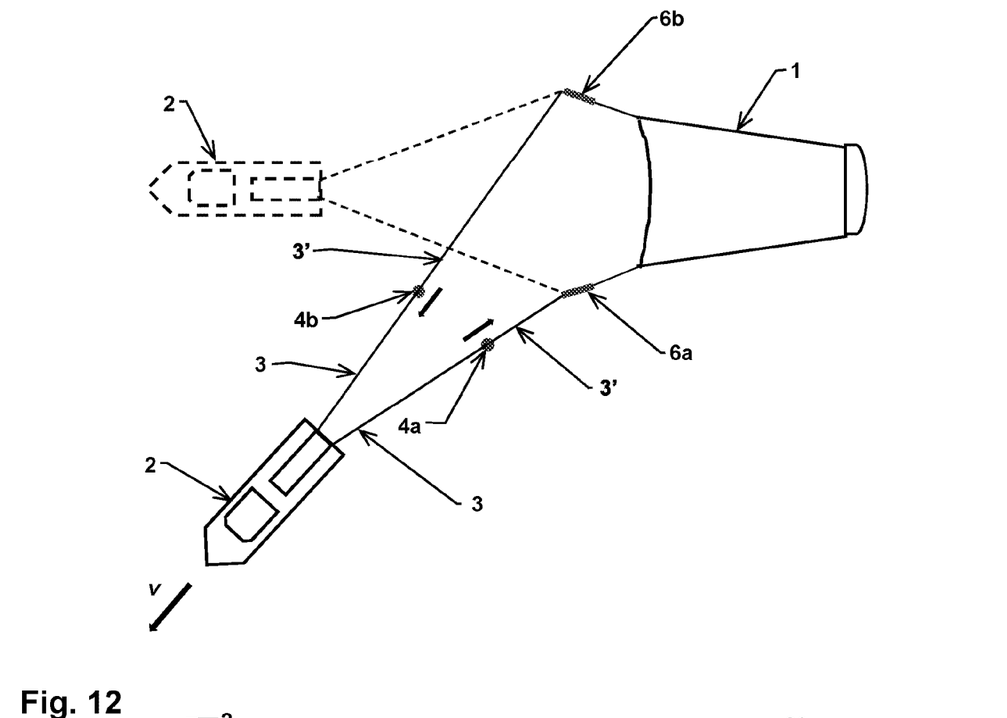
FIG. 12 is a schematic top view of a trawler and trawl making a turn.

FIGS. 11 and 12 illustrate two examples of how the invented control system may be used to control a trawl or similar towed object. In FIG. 11, the trawl inlet is misaligned. This misalignment may be corrected by moving one ballast member 4a towards the trawl and/or moving the other ballast member 4b towards the towing vessel 2, as indicated by the arrows. In general, therefore, the trawl geometry may thus be controlled by manipulation of the ballast members 4. It should be understood that the same principle applies to a spread of seismic streamer cables.

FIG. 12 illustrates how the invented control system may be used to control a trawl or similar towed object during a turn. When the towing vessel 2 deviates from a straight course (dotted lined) and enter a turn, the inner (with respect to the turn) ballast member 4a is lowered in the water (moved away from the vessel) and the outer ballast member 4b is raised (moved towards the vessel). The ballast members may be used to trim the trawl prior to and during the turn, and thus preventing it from collapsing or becoming misaligned. With this control system, the vessel speed may be reduced and the turn may be sharper, compared to the prior art systems. It should be understood that the same method applies to a spread of seismic streamer cables.

Figure 13:
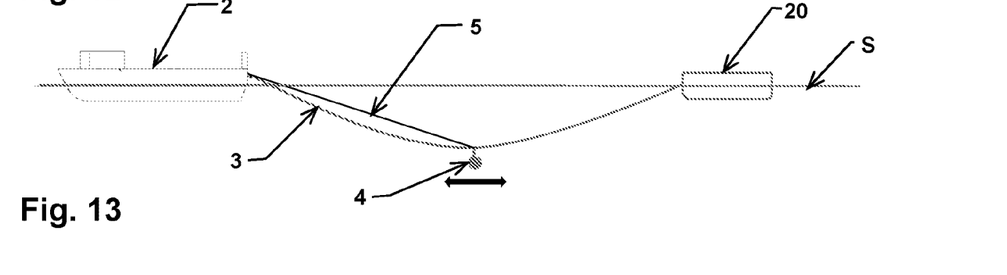
FIGS. 13 and 14 are schematic top views of a towed surface vessel and illustrates how the invention is used to control the towing member catenary.
Figure 14:
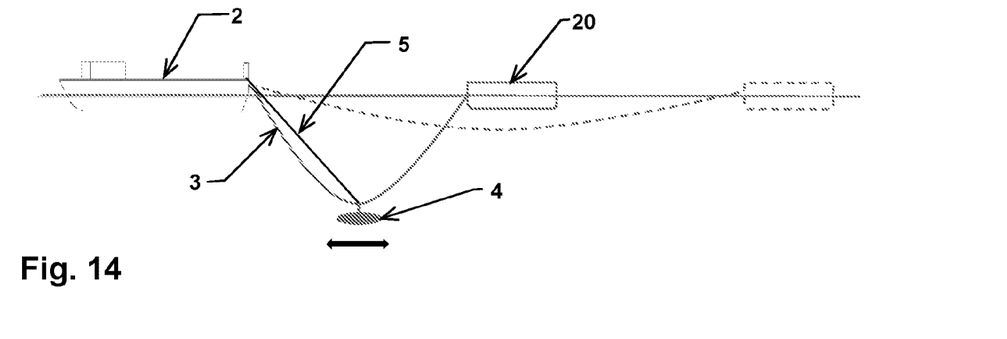

While the invented control system has been described above in contexts of controlling submerged towed objects, it is also applicable for controlling towed objects that float in the water surface, such as barges, floating platforms, ships and other floating vessels. Examples of such applications are illustrated in FIGS. 13 and 14, where a towed surface object 20 is being towed by a towing vessel 2 via a towing device 3. It should be understood that more than one towing device may be used. The towing device 3 may be a steel wire, chain, synthetic rope, or similar. The adjustable (movable) ballast member 4 is used to control the towing device catenary. The ballast member 4 may have a shape which has favourable hydrodynamic damping properties. It will be understood that a deep catenary (as shown in FIG. 14) prevents cavitation.

What is claimed is:

1. A control system for a towed object in or on a body of water, comprising:
   one or more towing devices extending between the object and a towing vessel,
   one or more ballasts movably connected to a respective one of said one or more towing devices, and
   a control cable configured to control the ballast position on the towing device, the control cable connected to a winch on the towing vessel, wherein the one or more ballasts are controllably movable at least a distance along its respective towing device.

2. The control system of claim 1, wherein at least one of the one or more ballasts and/or the towed object comprises a sensor and detector for determining a distance to a seabed.

3. The control system of claim 1, further comprising a weight connected to and extending a distance from the one or more ballast towards a seabed.

4. The control system of claim 1, wherein the towed object is a trawl with trawl boards.

5. The control system of claim 1, wherein the towed object is an elongate object.

6. The control system of claim 1, wherein the towed object comprises buoys such that the towed object has a neutral buoyancy.

7. The control system of claim 1, wherein the towed object is a vessel towed on the surface of the water.

8. The control system of claim 1, wherein the towed object and/or at least one of the one or more ballasts comprise a sensor/detector configured for determining a distance between said sensor/detector and a seabed, and the sensor/detector is configured to communicate with a transmitter/receiver at a distal location, said transmitter/receiver being configured to communicate with a communication controller; said communication controller being configured to communicate with the winch configured to control the position of at least one of the at least one ballasts.

9. The control system of claim 8, wherein the communication controller comprises a programmable logic controller (PLC).

10. A method of controlling a towed object with the control system of claim 1, in or on a body of water, the method comprising controllably moving one or more ballasts, which is movably connected to a respective one of a towing devices extending between the towed object and the towing vessel, at least a distance along its respective towing device, in order to control the catenary of said towing device.

11. The method of claim 10, wherein individual ballasts are manipulated individually in order to correct, preserve or otherwise change the geometry of the towed object and the towed object is a trawl.

12. The method of claim 10, wherein said movement of one or more ballasts is controlled based on information provided by a sensor/detector configured for determining a distance between said means and a seabed.

13. The method of claim 12, wherein said distance in pre-determined.

14. The control system of claim 5, wherein the elongate object is seismic cable or a cable, pipeline, hose, umbilical, or riser used in a petroleum industry.

15. The control system of claim 1, wherein the towing devices are selected from the group consisting of wires, chains and ropes.

\* \* \* \* \*